United States Patent [19]

Morris

[11] 4,097,897
[45] Jun. 27, 1978

[54] AUTOMATIC BOOST CONTROL IN AN APERTURE CORRECTOR FOR TV VIDEO SIGNALS

[75] Inventor: Edwin Earl Morris, Clinton, N.Y.

[73] Assignee: General Electric Company, Utica, N.Y.

[21] Appl. No.: 790,161

[22] Filed: Apr. 22, 1977

[51] Int. Cl.² .................. H04N 5/14; H04N 5/22
[52] U.S. Cl. ........................................... 358/162
[58] Field of Search .................. 358/162, 166, 96

[56] References Cited

U.S. PATENT DOCUMENTS 3,730,987   5/1973   Radecke .......................... 358/162

*Primary Examiner*—Robert L. Richardson

[57] ABSTRACT

A closed loop automatic boost control of an aperture correction circuit for a television camera using a high pass filter and thresholding circuitry in order to control the frequency boost by sensing the RMS value of the high frequency noise. The boost is achieved by separating the signal into a flat response and a high frequency boosted response. The amount of boost is determined by passing the high frequency boosted response through a variable gain amplifier.

4 Claims, 8 Drawing Figures

AUTOMATIC BOOST CONTROL IN AN APERTURE CORRECTOR FOR TV VIDEO SIGNALS

BACKGROUND OF THE INVENTION

1. Field of the Invention

The invention relates to a system for producing a correction signal for the aperture response of television video signals.

2. Description of Prior Art

Devices for automatically adjusting the amount of frequency boost in an aperture corrector for TV video signals have been disclosed in the art.

However, none of the prior art approaches sense the noise as a measurement of the amount of boost. U.S. Pats. No. 3,800,077 and 3,946,153 both sense the magnitude of the transition in the video and therefore are subject to scene content i.e., low boost for a scene with many transitions. U.S. Pat. No. 3,743,770 is an open loop system and depends on the characteristics of a varicap. Furthermore, it can only be used with antimony tri-sulfide vidicon cameras.

Accordingly, it is an object of the present invention to provide an automatic boost control aperture corrector that will operate independently of scene content and one which is independent of the TV sensor tube.

A further object is to provide a completely closed loop system which can control the amount of boost so that a minimum signal to noise ratio can be maintained.

SUMMARY OF THE INVENTION

The foregoing objects are achieved according to this invention through the utilization of a closed loop system which controls the noise inside the passband of the television system by measuring the noise outside the passband.

This is accomplished in the invention by utilizing a high pass filter with a cutoff frequency equal to the limiting resolution of the uncompensated system in order to filter the high frequency noise for further processing.

Threshold detecting circuitry and an operational amplifier are used in order to control the percentage of time that the high frequency noise exceeds a fixed threshold. The operational amplifier controls the gain of a video amplifier which has the effect of changing the frequency response of the system so that RMS noise level can be controlled. The fact that the white noise has a gaussian probability distribution is utilized so that the amount of boost is automatically adjusted by having the high frequency noise exceed a specific threshold voltage for a specific percentage of the time.

The instant invention thereby operates to keep the low frequency signal to high frequency noise at a constant ratio. Since the low frequency noise has the same characteristics and RMS value as the high frequency noise, the output signal to noise ratio remains constant. The desireable advantage of having an automatic aperture corrector that operates independently of scene content is therefore attained with the instant invention because it performs its processing with signals outside of the limiting resolution of the uncompensated system.

BRIEF DESCRIPTION OF THE DRAWINGS

Various other objects, features and attendant advantages of the present invention will be more fully appreciated from the following detailed description when considered in connection with the accompanying drawings.

DESCRIPTION OF THE PREFERRED EMBODIMENT

Figure 1:
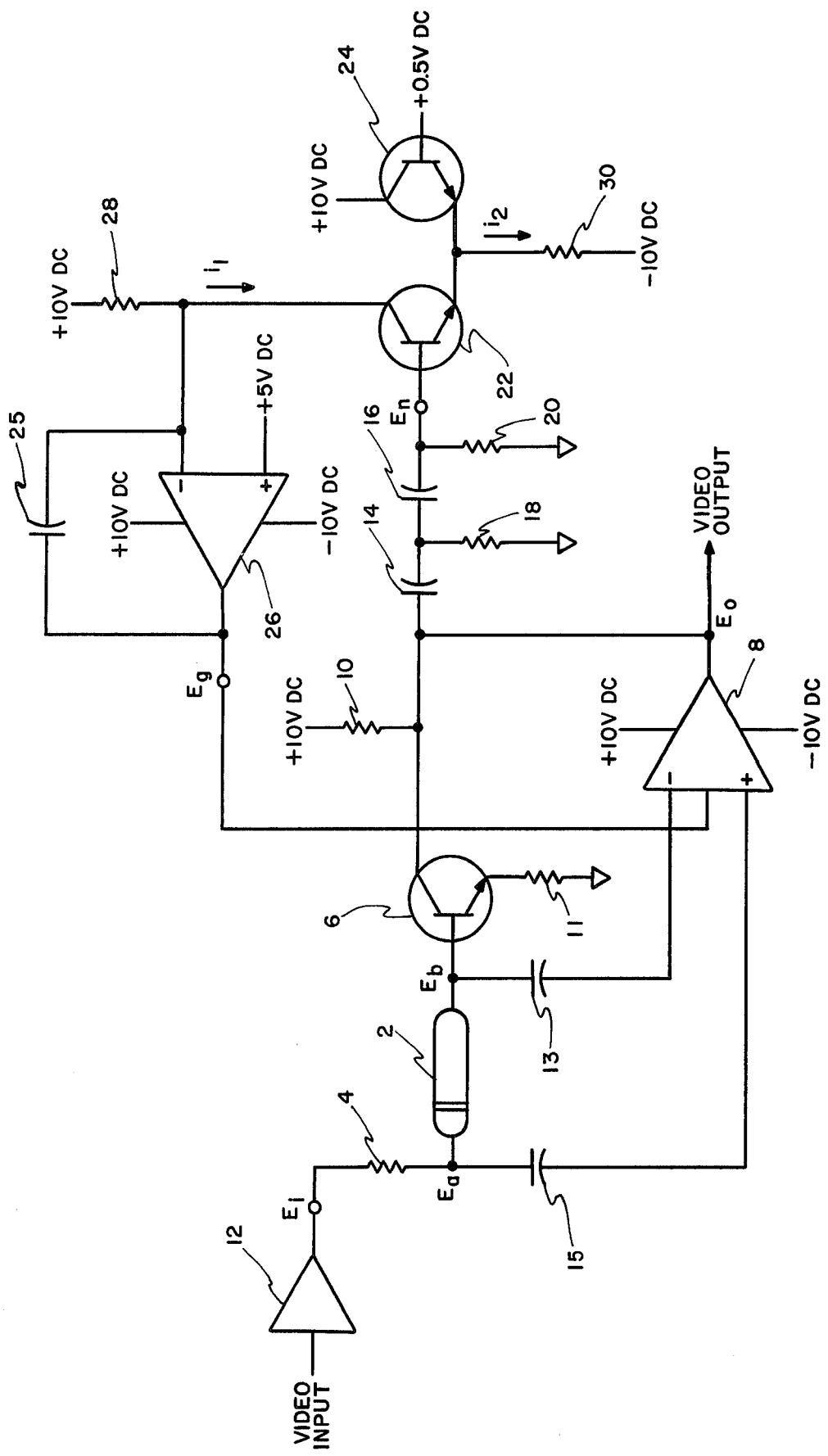
FIG. 1 is a schematic diagram of an embodiment of an automatic aperture corrector according to the invention.

A schematic diagram of the automatic aperture corrector circuit is shown in FIG. 1. The length of delay line 2 is determined by the television sensor being used and consequently the frequency of the maximum boost. Resistor 4 is chosen to be equal to the characteristic impedance of the delay line. The input impedance of transistor 6 and differential video amplifier 8 is made high so that the termination of delay line 2 will appear as an open circuit. Video amplifier 8 is a controllable gain video amplifier with an open collector current output e.g., Motorola MC 1590. Capacitors 13 and 15 function to AC couple the high frequency content of the information to video amplifier 8.

The output voltage $E_o$, is generated by the summation of the two video current sources into resistor 10. The first current source is from the collector of transistor 6. Transistor 6 operates as a straight video amplifier and amplifies the unboosted portion of the video signal by the ratio of the values of resistor 10 to the value of resistor 11. The portion of the output video signal contributed by the transistor 6 can be represented as follows:

$$E_{01} = -E_b\left(\frac{R_3}{R_2}\right) = -E_i\left(\frac{R_3}{R_2}\right)\epsilon^{-TS}$$

where $T$ = delay of delay line 2.

The second current source is from the output of video amplifier 8 which amplifies the differences in voltage between $E_a$ and $E_b$. This portion of the output voltage may be expressed as $E_{o2}$:

$$E_{O2} = A(E_a - E_b)$$

where $A$ is the voltage gain of video amplifier 8 with terminating resistor 10. The voltage at the end of the delay line, $E_b$ may be expressed as a function of the input voltage, $E_i$, as follows:

$$E_b = E_i \epsilon^{-Ts}$$

Since delay line 2 is terminated into an open circuit, there will be a one hundred percent in-phase reflection from the end of the delay line. This reflection will be completely terminated into the source impedance represented by resistor 4 which was made equal to the characteristic impedance of the delay line. Therefore, $E_a$ may be expressed as follows:

$$E_a = \frac{1}{2} E_i + \frac{1}{2} E_i \epsilon^{-2TS}$$

where the first term is the incident wave and the second term is the reflective wave with a round trip delay of 2T. Equations 3 and 4 can be substituted into equation 2 so that the output voltage of the second current source can be expressed as:

$$E_{O2} = -A [1 - \cos \omega T] E_i \epsilon^{-Ts}$$

The total output voltage, $E_O$, can be represented as:

$$E_O = E_{O1} + E_{O2}$$

$$E_O = -E_i \epsilon^{-Ts} [R_3/R_2 + A(1 - \cos \omega T)]$$

From the foregoing equation it can be seen that at $\omega = 0$ (i.e., at d.c.) the relative response of the aperture corrector is simply:

$$\left| \frac{E_0}{E_i} \right|_{\omega = 0} = \frac{R_3}{R_2}$$

When $\omega T = \pi$ or the frequency equals $\frac{1}{2}T$ the relative response may be expressed as follows:

$$\left| \frac{E_0}{E_i} \right|_{f = \frac{1}{2T}} = \frac{R_3}{R_2} + 2A$$

Figure 2:
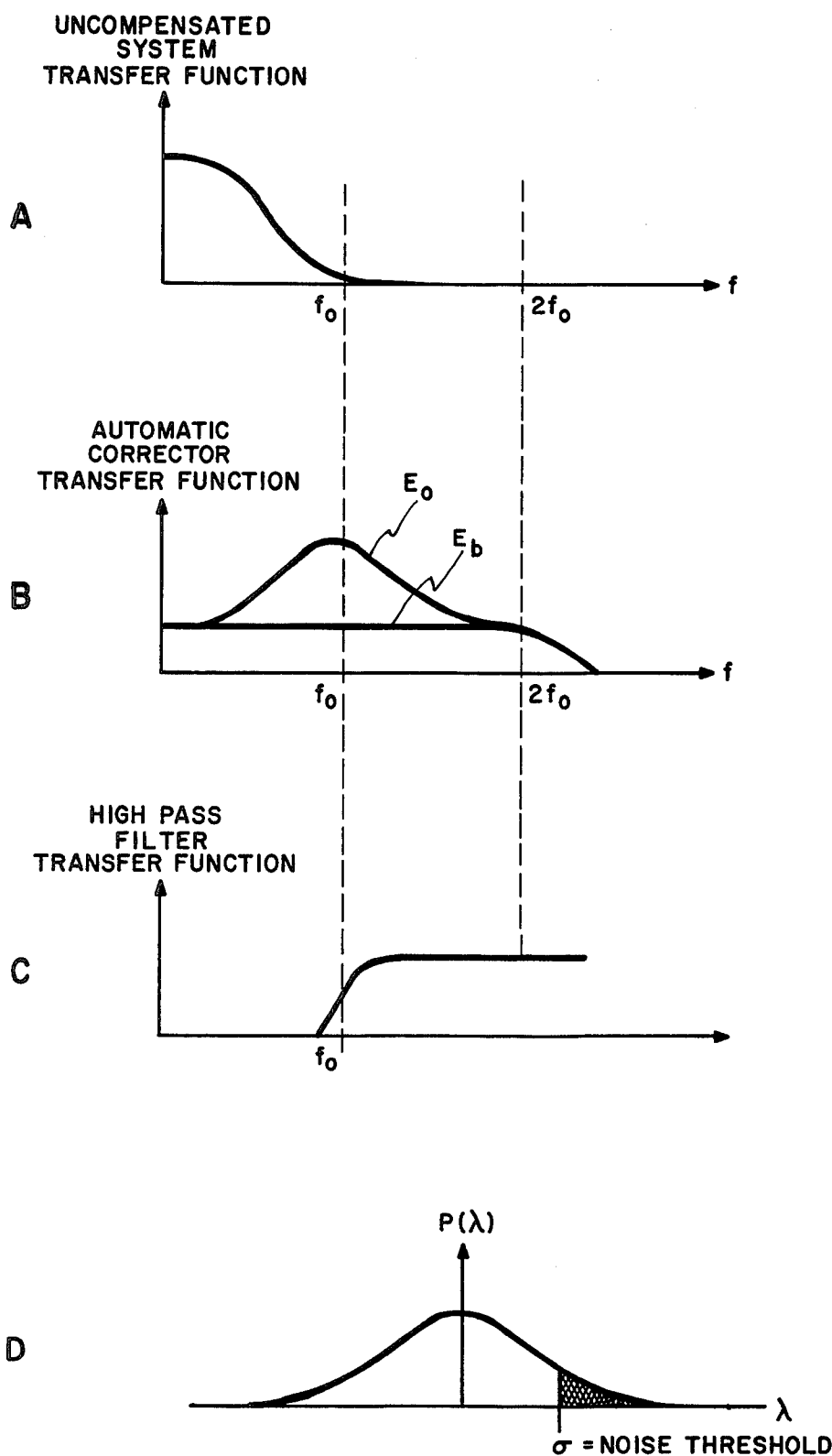
FIG. 2A represents the amplitude response of a TV system without the use of the instant invention.
FIG. 2B represents the amplitude response of an embodiment of an automatic aperture corrector according to the invention.
FIG. 2C represents the transfer function of the high pass filter utilized in the instant invention.
FIG. 2D represents the gaussian distribution of the noise.

FIG. 2A represents the transfer function of the television system without the use of the aperture corrector circuit. It can be seen that the uncompensated television systems frequency response is limited to its limiting resolution, $fo$. The transfer function of the automatic aperture corrector circuit is plotted from equation 7 and is shown in FIG. 2B. The bandwith of the automatic corrector circuit extends to twice the frequency corresponding to the limiting resolution of the uncompensated system. From equation 9 it can be seen that the high frequency response of the circuit is directly related to the gain of video amplifier 8 and that the phase response is completely independent of the gain A. Therefore, adjusting the gain A changes the amount of boost in the circuit. The amount of boost is equal to the ratio of $E_o$ to $E_b$.

Given that the noise is "white", the RMS (root mean square) value of the noise contained in the frequency spectrum between 0 hertz and the limiting resoluting, $fo$, is the same as the noise between $fo$ and $2fo$. Furthermore, given that the frequency boosting is symetrical about $fo$, detecting the RMS noise above $fo$ is equivalent to detecting RMS noise below $fo$. For this reason the instant invention utilizes a high pass filter whose transfer function is illustrated in FIG. 2C in order to extract the noise above the limiting resolution of the television system for further processing. Since the noise content can be considered as guassian, knowing the percentage of time that the noise exceeds a fixed threshold is equivalent to knowing the RMS value of the noise. For example, as shown in FIG. 2D the noise threshold can be selected at the 1 sigma point of a guassian distribution so that the noise will exceed that threshold voltage for 15.8% of the time.

The purpose of video amplifier 8 is to control the magnitude of the gain A and consequently the percentage of boost. By controlling the percentage of time that the high frequency noise exceeds a fixed threshold the RMS noise level is controlled. This is accomplished by controlling the frequency response as shown in FIG. 2B.

As the preamp input signal decreases, the agc video amplifier 12 increases the gain to maintain a fixed output signal, $E_i$. However, the agc video amplifier 12 also increases the noise. The increased noise is sensed and the boost is reduced by the automatic boost control aperture corrector. Consequently the low frequency signal to high frequency noise remains constant, since the low frequency noise equals the high frequency noise, the output signal to noise remains constant.

The high pass filter is composed of capacitors 14 and 16 and resistors 18 and 20. The output of the filter is connected to thresholding circuitry composed of transistors 22 and 24 and resistor 30 with the threshold set at a d.c. reference voltage e.g., 0.5 volts. In order to fully explain the operation of the circuit, it is first assumed that there are no high frequency signals (En=0), the base of transistor 22 will remain at 0 volts and the collector of transistor 22 will rise to +10 volts. Since this voltage is connected to the negative input of operational amplifier 26, and the positive input of operational amplifier 26 is connected to a +5 volts reference, the output of operational amplifier 26 will saturate negatively. This will cause the video amplifier 8 to go to the maximum gain point giving the maximum boost. Capacitor 25 and operational amplifier 26 are configured as an integrator so that the average value of the current pulses, $i_1$, can be determined in the form of a d.c. voltage to control the gain of video amplifier 8. For operational amplifier 26, to come out of saturation, the average voltage at its negative input must be +5 volts. This means that during normal operation the average current $i_1$ must be equal to +5 volts divided by the value of resistance 28 (5 v/31.6K = 158$_\Gamma$A). The total emitter current of transistor 22 plus transistor 24 represented by $i_2$ is 10.5 volts less the 0.7 voltage drop between the emitter and base of transistor 24 divided by the value of resistor 30 (10.5v - 0.7v/9.8k = 1.0ma).

Figure 3:
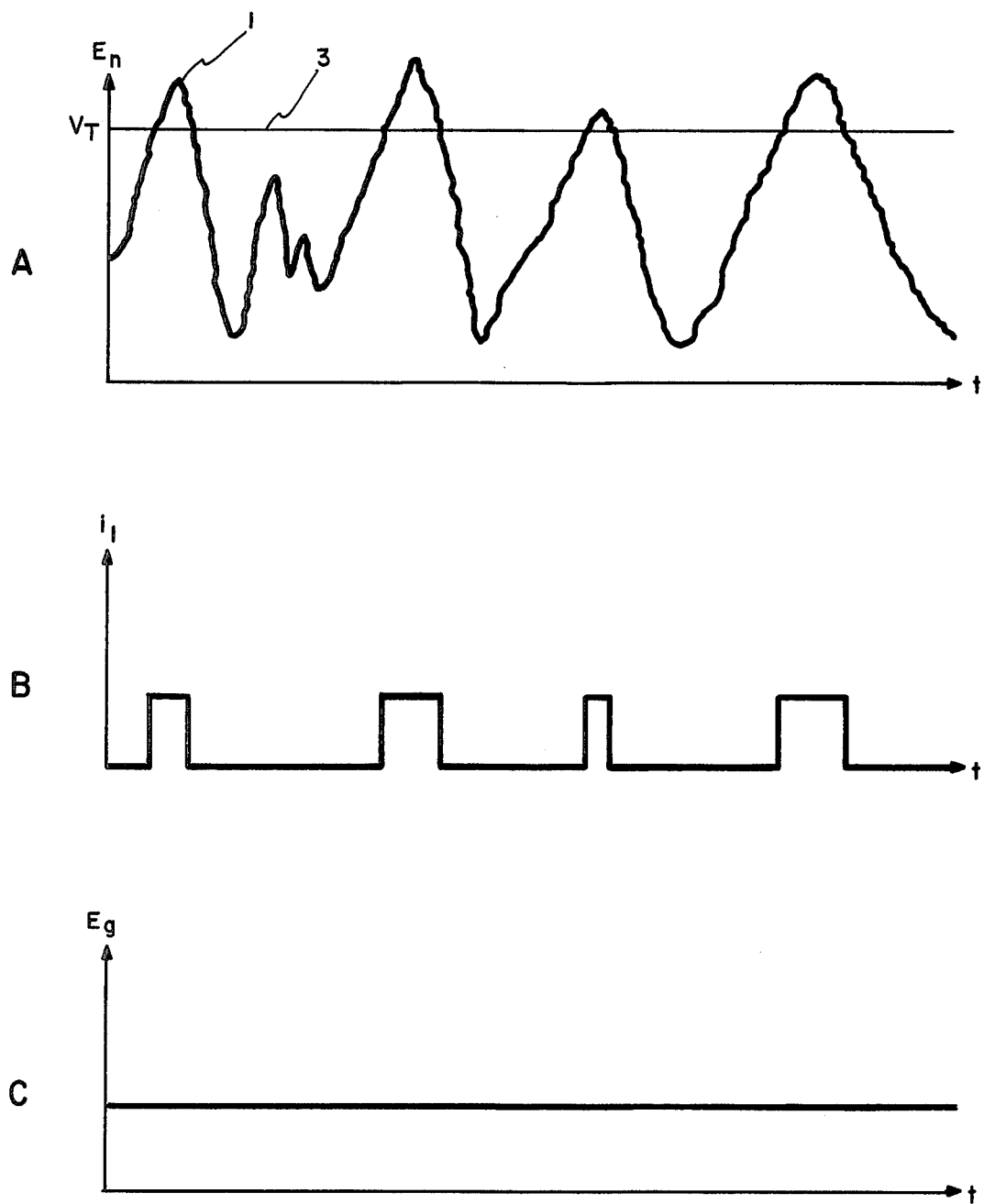
FIG. 3A represents a typical noise signal present during the normal mode of operation.
FIGS. 3B and 3C represent the current $i_1$, and the gain control voltage respectively, corresponding to the typical noise signal shown in FIG. 3A.

During the normal mode of operation, the noise signal En may appear as illustrated by curve 1 shown in FIG. 3A. At only those intervals of time that the value of En exceeds the threshold voltage $V_T$, (curve 3), will transistor 22 conduct. This operation will cause the current $i_1$, and the gain control voltage Eg, to appear as shown in FIGS. 3$b$ and 3C respectively. By setting the threshold voltage $V_T$ at the RMS level of the noise, the noise signal, En, will exceed the threshold voltage 15.8% of the time.

When "white" gaussian noise is added to the input with the system at maximum boost, the aperture corrector will boost the high frequency noise which will pass the high pass filter and cause transistor 22 to conduct when the noise pulses exceed 0.5 volts. If the noise exceeds the threshold more than 15.8 percent of the time operational amplifier 26 will go positive and lower the value of the gain control voltage, Eg. With a lower value of Eg, video amplifier 8 will have a lower gain and consequently the amount of boost will be decreased. This will reduce the RMS value of the noise En, at the base of transistor 22. Therefore, the amount of boost is automatically adjusted until the noise exceeds 0.5 volts exactly 15.8 percent of the time. Since the noise was assumed to be gaussian this means that the high frequency noise was controlled at an RMS value of 0.5 volts. From a gaussian distribution curve, a noise signal will exceed the RMS value 15.8 percent of the time. Changing the frequency response does not change the statistics of the noise. Filtered gaussian noise is still gaussian noise.

One set of typical values for the circuit elements shown in FIG. 1 are as follows: delay line 2—50 nsec. delay line, resistor 4—300 ohms, transistor 6—2N918, amplifier 8—Motorola MC 1590, resistor 10—1000 ohms, resistor 11—100 ohms, agc amplifier 12—Motorola MC 1590, capacitor 13—10 microfarads, capacitor 14—22 picofarads, capacitor 15—10 microfarads, capacitor 16—22 picofarads, resistor 18—1000 ohms, resistor 20—1000 ohms, transistor 22—2N918, transsitor 24—2N918, capacitor 25—5 microfarads, amplifier 26—Microamp 741, resistor 28—31,600 ohms and resistor 30—9800 ohms.

I claim:

1. An automatic boost control of an aperture correction circuit for a video signal in a television camera comprising:
    an input connection adapted to receive the video signal;
    a first resistor having its first end connected to said input connection;
    a delay line having an input and an output terminal with said input terminal connected to the second end of said first resistor;
    a differential video amplifier connected to each end of said delay line to provide an output boost signal;
    a second video amplifier connected to said output terminal of said delay line to amplify said video signal;
    a high pass filter connected in circuit with the output of said second video amplfier to extract high frequency noise from the video signal; and
    detecting means connected in circuit with said high pass filter for detecting an RMS value signal of said high frequency noise, the output of said RMS detector being connected to said differential video amplifier in order to control the gain of said amplifier, thereby controlling the amount of boost.

2. The circuit as recited in claim 1, whereby said high frequency noise is the only portion of the noise utilized to form said boost signal.

3. The circuit as recited in claim 1, wherein the detecting means further comprises:
    an input terminal adapted to receive the high frequency noise signal;
    a first transistor having its base connected to said input terminal;
    a second resistor having its first end connected to the emitter of said first transistor and having its second end connected to a first D.C. control voltage;
    A second transistor having its emitter connected to the emitter of said first transistor, and having its collector connected to a second D.C. control voltage and having its base connected to a third D.C. control voltage which provides a threshold voltage for said high frequency noise;
    a third resistor having its first end connected to the collector of said first transistor and having its second end connected to said second D.C. control voltage;
    a first operational amplifier having an output terminal, and having a negative input terminal connected to said first end of said third resistor and having a positive input terminal connected to a fourth D.C. control voltage; and
    a first capacitor having its first end connected to said negative input terminal of said first operational amplifier and having its second end connected to said output terminal of said first operational amplifier.

4. An automatic boost control of an aperture correction circuit for a video signal in a television camera comprising:
    an input connection adapted to receive the video signal;
    an impedance matching means having its first end connected to said input connection;
    a delay means having an input and output terminal with said input terminal connected to the second end of said impedance matching means;
    a first differential amplification means connected to each end of said delay means to provide an output boost signal;
    a second amplification means connected to said output terminal of said delay means to amplify the unboosted portion of the video signal;
    a high pass filtering means connected in circuit with the output of said second amplification means to extract high frequency noise from the video signal; and
    detecting means connected in circuit with said high pass filtering means for detecting an RMS value signal of said high frequency noise, the output of said detecting means being connected to said differential amplification means in order to control the gain of said amplification means, thereby controlling the amount of boost.

* * * * *